US011110556B2

(12) United States Patent
Hinrichs et al.

(10) Patent No.: US 11,110,556 B2
(45) Date of Patent: Sep. 7, 2021

(54) METHOD FOR SCREWING A LOCKING RING ONTO A THREADED BOLT

(71) Applicant: Broetje-Automation GmbH, Rastede (DE)

(72) Inventors: Bruno Hinrichs, Oldenburg (DE); Jannik Harms, Rastede (DE)

(73) Assignee: Broetje-Automation GmbH, Rastede (DE)

( * ) Notice: Subject to any disclaimer, the term of this patent is extended or adjusted under 35 U.S.C. 154(b) by 469 days.

(21) Appl. No.: 15/511,293

(22) PCT Filed: Sep. 15, 2015

(86) PCT No.: PCT/EP2015/071059
§ 371 (c)(1),
(2) Date: Jul. 17, 2017

(87) PCT Pub. No.: WO2016/041942
PCT Pub. Date: Mar. 24, 2016

(65) Prior Publication Data
US 2017/0361408 A1    Dec. 21, 2017

(30) Foreign Application Priority Data

Sep. 15, 2014 (DE) ..................... 10 2014 113 263.7

(51) Int. Cl.
*B21J 15/02* (2006.01)
*B23P 19/06* (2006.01)
(Continued)

(52) U.S. Cl.
CPC .......... *B23P 19/064* (2013.01); *B21J 15/022* (2013.01); *B21J 15/142* (2013.01); *B21J 15/32* (2013.01);
(Continued)

(58) Field of Classification Search
CPC ......... B23P 19/06; B23P 19/064; B23P 19/12; Y10T 29/49943; Y10T 29/49956; Y10T 29/5118; Y10T 29/5377
See application file for complete search history.

(56) References Cited

U.S. PATENT DOCUMENTS

| 4,538,483 A | 9/1985 | Batten et al. |
| 4,858,289 A * | 8/1989 | Speller, Sr. ............ B21J 15/10 |
| | | 29/34 B |

(Continued)

FOREIGN PATENT DOCUMENTS

| DE | 102005050018 | 5/2007 |
| DE | 102012204015 | 9/2013 |

(Continued)

OTHER PUBLICATIONS

International Preliminary Report on Patentability for PCT/EP2015/071059 (priority application for U.S. Appl. No. 15/511,293) dated Mar. 30, 2017 (10 pages), English translation.

(Continued)

*Primary Examiner* — Jason L Vaughan
*Assistant Examiner* — Amanda Kreiling
(74) *Attorney, Agent, or Firm* — Pauly, DeVries Smith & Deffner LLC (57) ABSTRACT

The disclosure relates to a method for screwing a locking ring onto a threaded bolt, wherein a coupling device for being threaded into the threaded bolt is driven in rotation by a rotary drive, and wherein the locking ring is then screwed onto the threaded bolt, which is fixed by the coupling device, by a locking ring holder which is driven in rotation by the rotary drive. The disclosure likewise relates to a method for screwing a locking ring comprising a fastening part and a tear-off part onto a threaded bolt, wherein a removal gripper grips the tear-off part and removes the tear-off part after the tear-off part has been torn off. The disclosure further relates (Continued)

to a screwing apparatus for executing a method according to the disclosure.

20 Claims, 5 Drawing Sheets

(51) Int. Cl.
| | | |
|---|---|---|
| *B21J 15/14* | (2006.01) | |
| *F16B 31/02* | (2006.01) | |
| *B21J 15/32* | (2006.01) | |
| *B21J 15/34* | (2006.01) | |
| *B23P 19/12* | (2006.01) | |
| *B25B 21/00* | (2006.01) | |

(52) U.S. Cl.
CPC ............... *B21J 15/34* (2013.01); *B23P 19/06* (2013.01); *F16B 31/021* (2013.01); *B23P 19/12* (2013.01); *B25B 21/001* (2013.01)

(56) References Cited

U.S. PATENT DOCUMENTS 5,305,666 A   4/1994 LaTorre et al.

2013/0212883 A1\*   8/2013 Soto Martinez ...... B23P 19/005
                                                                29/897.2
2013/0239398 A1    9/2013 Bense et al.
2015/0082605 A1\*   3/2015 Batt ........................ B23P 19/06
                                                                29/505

FOREIGN PATENT DOCUMENTS

| DE | 102012208067 | 11/2013 |
|---|---|---|
| WO | 2016041942 | 3/2016 |

OTHER PUBLICATIONS

International Search Report and Written Opinion for PCT/EP2015/071059 (priority application for U.S. Appl. No. 15/511,293) dated Dec. 1, 2015 (11 pages).

Search Report for German Patent Application No. 102014113263.7 (priority application for U.S. Appl. No. 15/511,293) dated Aug. 25, 2016 (7 pages).

\* cited by examiner

METHOD FOR SCREWING A LOCKING RING ONTO A THREADED BOLT

CROSS-REFERENCE TO RELATED APPLICATIONS

This application is a national stage application under 35 U.S.C. 371 of International Patent Application Serial No. PCT/EP2015/071059, entitled "METHOD FOR SCREWING A LOCKING RING ONTO A THREADED BOLT," filed Sep. 15, 2015, which claims priority from German Patent Application No. DE 10 2014 113 263.7, filed Sep. 15, 2014, the disclosure of which is incorporated herein by reference.

FIELD OF THE TECHNOLOGY

The disclosure relates to various methods for screwing a locking ring onto a threaded bolt and to a screwing apparatus for executing the various methods.

BACKGROUND

Rivet connections of various types are generally used for connecting structural components, for example in the aviation engineering sector. One variant among these provides for the use of rivet bolts with a threaded section—called a threaded bolt here and below. After the threaded bolt has been passed through the openings in the structural components, a locking ring—also called a collar—is screwed onto the threaded bolt in order to establish the rivet connection. To this end, the threaded bolt is fixed against rotation, specifically generally by a pin of a coupling device being threaded into a correspondingly contoured receptacle of the threaded bolt. Owing to this fixing of the threaded bolt, the locking ring can be screwed on and tightened with the required torque.

To date, these types of connections have been made by manually controlled tools for the most part. This is time-consuming firstly in respect of threading the pin into the rivet bolt in order to fix it and possibly also in respect of threading a locking ring holder onto the locking ring in order to be able to screw the locking ring on.

SUMMARY

Therefore, the disclosure is based on the problem of being able to establish connections of this kind in a more highly automated manner.

The above problem is solved in line with the teachings of the disclosure in the cases of methods for screwing a locking ring onto a threaded bolt. The problem is likewise solved by a screwing apparatus as described herein.

For the first teaching of the disclosure, it can be essential to know that the same drive can be used both to drive the locking ring holder in rotation and also to drive the coupling device in rotation. As a result, the steps of threading the coupling device into the threaded bolt and of screwing on the locking ring holder can be automated since these steps are each based on a rotary movement, generally also about the same rotation axis.

Therefore, the drive can execute a first rotary movement which is transmitted to the coupling device for being threaded into the threaded bolt, and can then execute a second rotary movement which is transmitted to the locking ring by the locking ring holder, so that the locking ring is screwed onto the threaded bolt. Manual intervention is not required for these steps, as a result of which the entire process can proceed in an automated manner.

Various embodiments can provide that the rotary drive for driving the locking ring holder is also used for threading the locking ring holder onto the locking ring.

In addition to a rotary movement of this kind, a linear movement, in particular along the rotation axis or screw axis of the coupling device, is also provided according to some embodiments. In this way, the coupling device can secure the locking ring against falling down while the locking ring holder is being screwed onto the locking ring. Additional possible ways of securing the locking ring are also presented herein.

In a second step, the coupling device can then continue to be linearly moved until it makes contact with the threaded bolt according to some embodiments. Similarly, a corresponding linear movement for the locking ring holder is provided in various embodiments.

In principle, there are various possible ways of alternately driving the coupling device and the locking ring holder using the same rotary drive. Various embodiments include providing a clutch arrangement and, in particular, a freewheeling arrangement for this purpose, so that the coupling device or the locking ring holder is respectively driven depending on the rotation direction of the motor.

A tube arrangement according to various embodiments, within which the above linear movements can take place, protects the screwing-on process against external influences and makes it easier to correctly place the coupling device and the locking ring holder relative to the threaded bolt.

Some embodiments include providing a feed gripper which feeds the locking ring for screwing it onto the threaded bolt from a store and suitably positions said locking ring for the threading-in operation.

One refinement of the above locking rings provides that they have a tear-off section, so that the tear-off section is incidentally separated from the locking ring when a tear-off torque is reached when the locking ring is being screwed on. The objective of this is to ensure that the connection has been established and/or the locking ring has been tightened with the desired torque. Various embodiments relate to the use of locking rings of this kind.

For the second teaching of the disclosure, it can be essential to know that a removal gripper can be provided, which removal gripper actively removes a tear-off part of this kind from the locking ring holder after the locking ring has been screwed onto the threaded bolt. This ensures disposal and, in particular, it is possible to ensure in this way that the timing of the screwing process is improved overall.

An embodiment provides a method for screwing a locking ring onto a threaded bolt, wherein a coupling device for being threaded into the threaded bolt, such as about a screw axis, is driven in rotation by a rotary drive, and wherein the locking ring is then screwed onto the threaded bolt, which is fixed by the coupling device, by a locking ring holder which is driven in rotation by the rotary drive.

In various embodiments, the locking ring holder for being threaded onto the locking ring is driven in rotation by the rotary drive, such as about the screw axis.

In various embodiments, in order to secure the locking ring during threading of the locking ring holder onto the locking ring, the coupling device is moved linearly, such as along the screw axis, until it is guided through the locking ring.

In various embodiments, after the locking ring holder has been threaded onto the locking ring, the coupling device is moved linearly, such as along a screw axis, until the coupling device makes contact with the threaded bolt.

In various embodiments, threading onto the locking ring involves establishing interlocking engagement between the locking ring holder and the locking ring, and/or in that threading into the threaded bolt involves establishing interlocking engagement between the coupling device and the threaded bolt.

In various embodiments, the locking ring holder has a bore for drawing in the locking ring using a negative pressure, in particular using a vacuum.

In various embodiments, the rotary drive has a motor and a clutch arrangement, in particular a freewheeling arrangement, for driving engagement of the motor with the locking ring holder and the coupling device, in particular so that only the locking ring holder is driven in rotation when the motor moves in a first direction, and, in some embodiments, only the coupling device is driven in rotation when the motor is moved in a direction which is opposite the first direction, further particularly in that the respective rotation directions of the locking ring holder and of the coupling device oppose each another.

In various embodiments, after the coupling device has been threaded into the threaded bolt, the locking ring holder is moved linearly, such as along a screw axis, with the locking ring until the locking ring makes contact with the threaded bolt, such that the coupling device is stationary substantially along the screw axis during the linear movement of the locking ring holder.

In various embodiments, the threaded bolt is guided through connecting piece openings in connecting pieces, and in that a tube arrangement runs around a bolt section which protrudes out of the connecting piece openings, such that the coupling device and/or the locking ring holder are each moved linearly through the tube arrangement, in particular in that the tube arrangement has an inside diameter which corresponds substantially to an outside diameter of the locking ring holder.

In various embodiments, the coupling device is moved linearly by a linear drive, such that the locking ring holder is moved linearly by the linear drive, in particular in that the coupling device and the locking ring holder can each be moved by the linear drive independently of one another.

In various embodiments, the locking ring holder has an inner contour, such as an inner polygon, for fixing the locking ring, in particular in that the inner contour forms a passage opening through which the coupling device can be moved, further particularly along a screw axis.

In various embodiments, a feed gripper grips the locking ring, such as in a force-fitting manner, in particular from a store, and positions the locking ring on the screw axis relative to the locking ring holder for threading in the locking ring holder, further particularly in that the feed gripper executes a movement substantially perpendicular to the screw axis in order to position the locking ring.

In various embodiments, the locking ring has a fastening part and a tear-off part, such as with a thread-free inner wall, and in that the tear-off part is torn off from the fastening part when an, in particular predefined, tear-off torque is reached when the locking ring is being screwed on, in particular in that the locking ring holder acts on the locking ring at the tear-off part when said locking ring is being screwed on, further particularly in that the locking ring has a predetermined breaking point, in particular a material weakening, between the fastening part and the tear-off part.

In various embodiments, the fastening part has a threaded section with an internal thread, and has a spacer section which can be arranged on the bolt-side in relation to the threaded section, in particular a deformation section for crimping, and which has a thread-free-inner wall, in particular wherein a spacer inside diameter of the spacer section is larger than a thread inside diameter of the threaded section.

In various embodiments, a tear-off inside diameter of the tear-off part is larger than the thread inside diameter and/or larger than the spacer inside diameter.

In various embodiments, the locking ring holder further grips the tear-off part after the tear-off part has been torn off, such that the locking ring holder is moved away linearly from the threaded bolt, in particular along the screw axis, after the tear-off part has been torn off, further particularly in that the coupling device with the locking ring holder is moved away from the threaded bolt.

In various embodiments, the method for screwing a locking ring can comprise a fastening part and a tear-off part onto a threaded bolt, in particular as described herein, wherein a removal gripper, which can be separate from the feed gripper, grips the tear-off part, further particularly in a force-fitting manner, and removes the tear-off part after the tear-off part has been torn off, in particular after the locking ring holder has been moved away from the threaded bolt, further such that the removal gripper executes a movement perpendicular to the screw axis in order to remove the tear-off part.

In various embodiments, the tear-off part is released from the locking ring holder by the coupling device, such as by virtue of a linear movement of the coupling device along the screw axis, in particular in that the coupling device has a lifting surface for releasing the tear-off part.

In various embodiments, a screwing apparatus for executing the method as described herein is provided.

BRIEF DESCRIPTION OF THE DRAWINGS

In the drawing, which illustrates only one exemplary embodiment.

DETAILED DESCRIPTION

Figure 1:
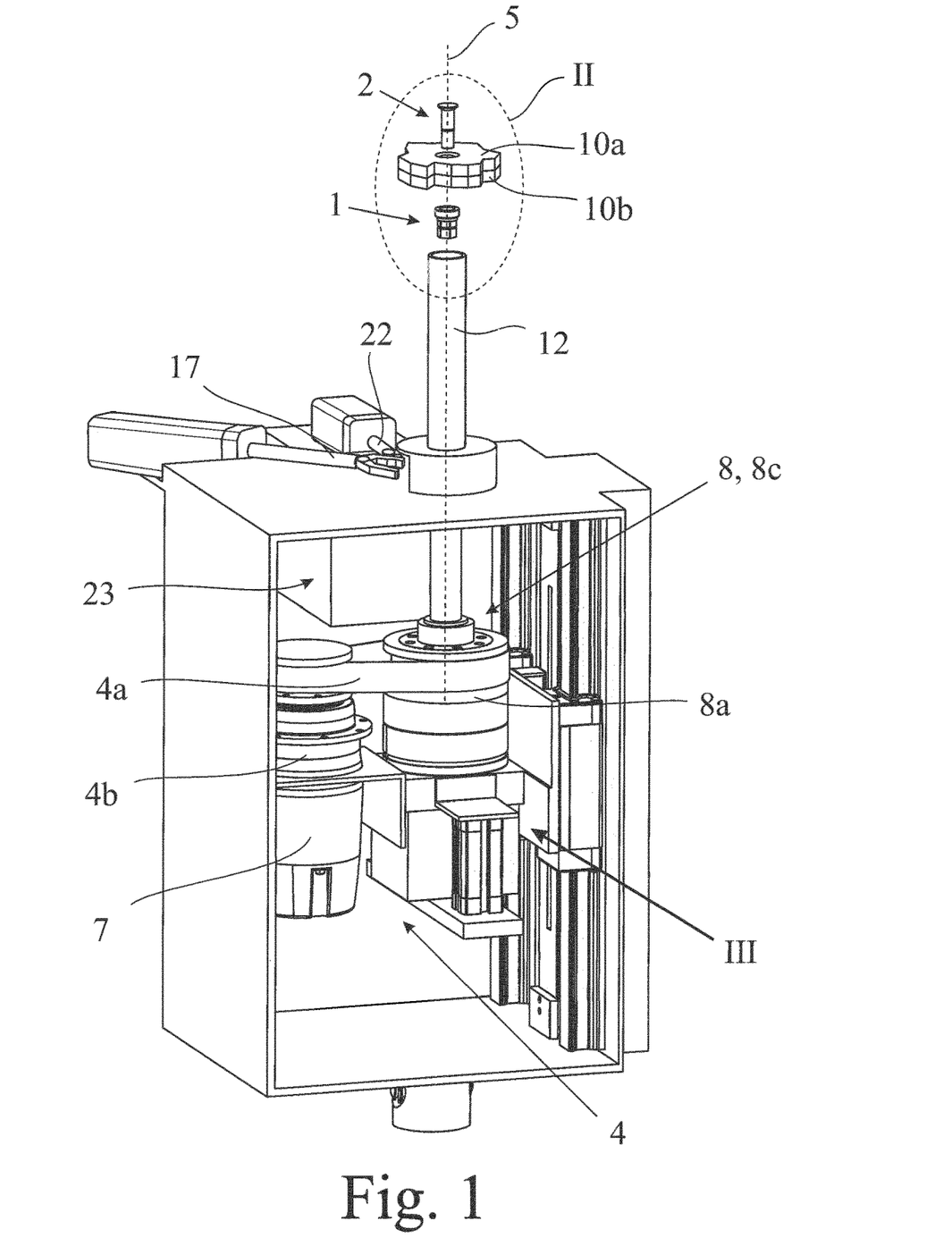
FIG. 1 shows a perspective view of a screwing apparatus for executing the proposed method.
Figure 4:
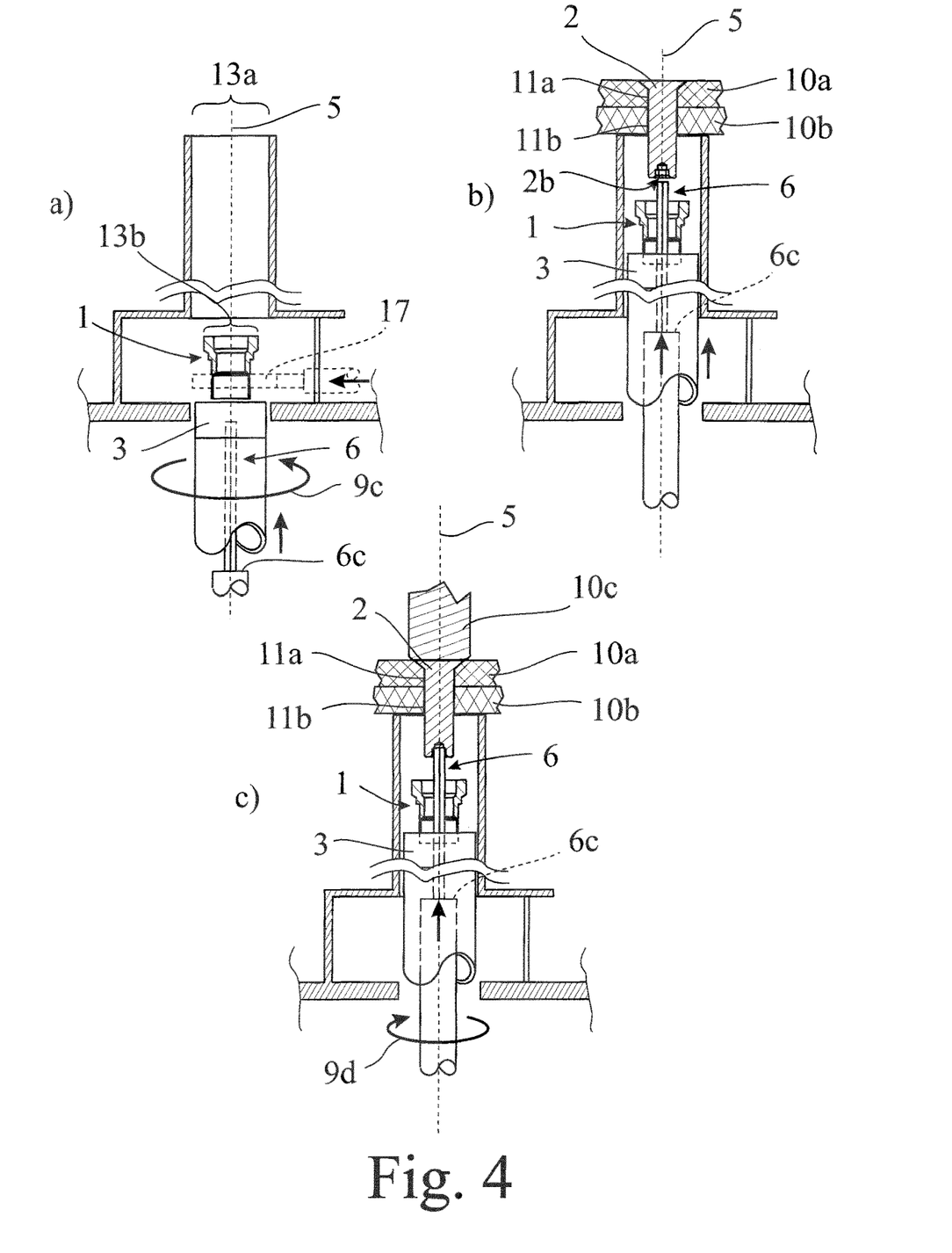
FIGS. 4a-c show a longitudinal section through the screwing apparatus of FIG. 1 at three different times before the locking ring is screwed on during execution of the proposed method.
Figure 5:
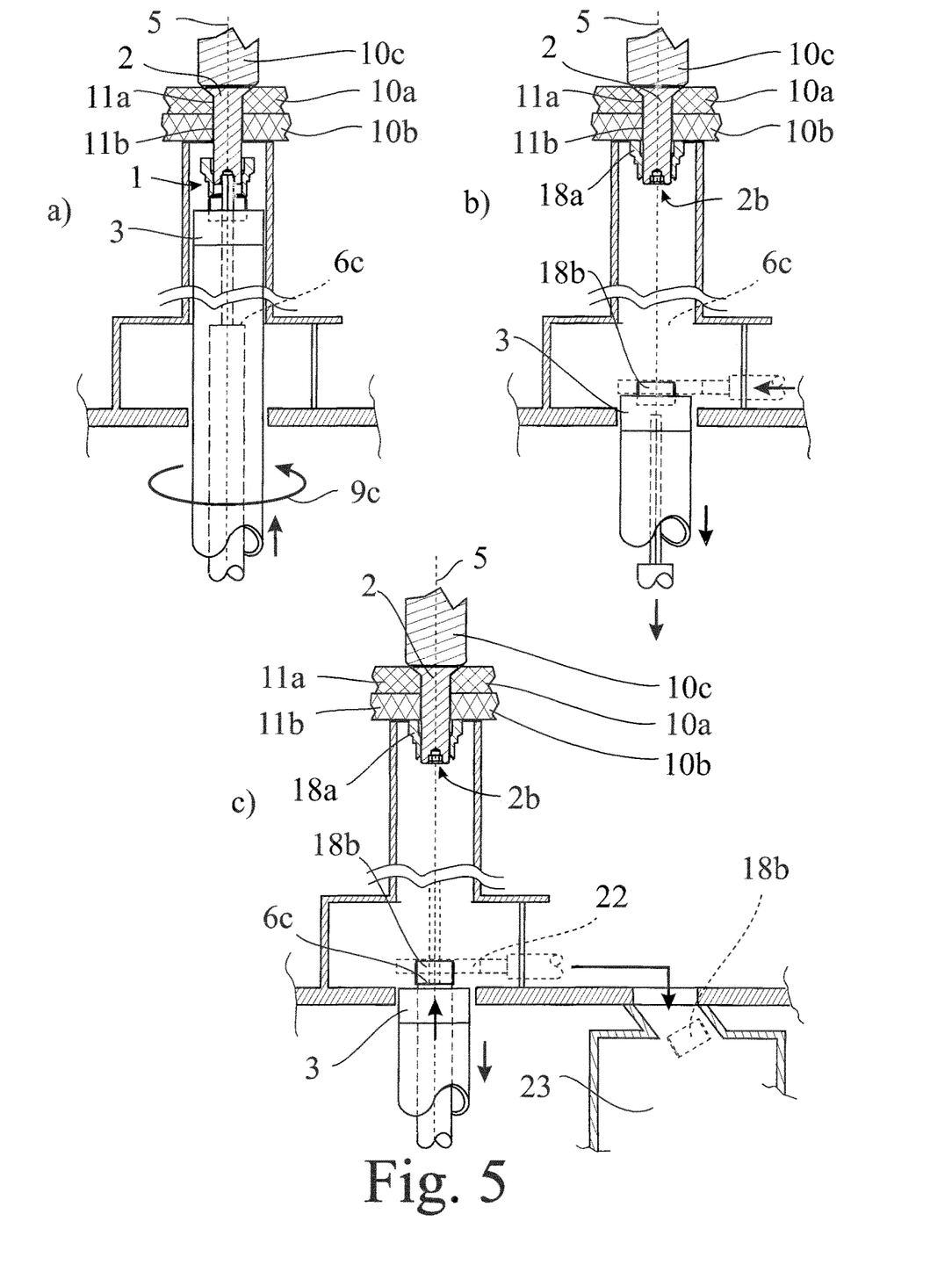
FIGS. 5a-c show the view of FIG. 4 at three different times while and after the locking ring is being/has been screwed on during execution of the proposed method.

According to the first teaching, the proposed method relates to screwing a locking ring 1 onto a threaded bolt 2. In this case, a coupling device 6 for being threaded into the threaded bolt 2 is driven in rotation by a rotary drive 4, such as about a screw axis 5. Here and below, the term "threading in" is generally to be understood to mean the alignment, in particular by rotation, and possibly the translatory movement of a first connecting part for establishing a connection and, in particular, an interlocking connection with a corresponding second connecting part. An example of this is the orientation of a square key for grasping a corresponding screw with a square head. Returning to the exemplary embodiment, the basic configuration of the above parts is shown in FIG. 1 and in more detail in FIG. 2. According to the proposed method, the locking ring 1 is then screwed onto the threaded bolt 2, which is fixed by the coupling device 6, by a locking ring holder 3 which is driven in rotation by the rotary drive 4. This screwing-on operation is illustrated in FIG. 5a, wherein the coupling device 6 is threaded into the threaded bolt 2 between the illustrations of FIG. 4b and FIG. 4c. Therefore, the rotary drive 4 has a dual function of driving firstly the locking ring holder 3 and secondly the coupling device 6.

The locking ring holder 3 for being threaded onto the locking ring 1 can likewise be driven in rotation by the rotary drive 4. This rotation can also take place about the screw axis 5. In principle, the locking ring holder 3 and the coupling device 6 can be threaded in in any desired order. In the drawing, the locking ring holder 3 is threaded onto the locking ring 1 between the illustrations of FIG. 4a and FIG. 4b.

In principle, the coupling device 6 is not involved in the process of threading the locking ring holder 3 onto the locking ring 1. However, it can be used, for example, for the purpose of preventing the locking ring 1 from falling down during this threading-in operation. Here, for the purpose of securing the locking ring 1 during threading of the locking ring holder 3 onto the locking ring 1, that the coupling device 6 is linearly moved until it is passed through the locking ring 1. This linear movement of the coupling device 6, which can take place along the screw axis 5, is indicated in FIG. 4a.

A linear movement of this kind can, as it were, form a forward movement of the coupling device 6 before it is threaded into the threaded bolt 2. Therefore, it can be provided that, after the locking ring holder 3 has been threaded onto the locking ring 1, the coupling device 6 is moved linearly until the coupling device 6 makes contact with the threaded bolt 2. This linear movement can also take place along the screw axis 5, as is illustrated by way of example in FIGS. 4b and 4c. As is likewise illustrated, the locking ring holder 3 can also be at least partially moved during this movement of the coupling device 6.

Threading onto the locking ring 1 can involve establishing interlocking engagement between the locking ring holder 3 and the locking ring 1. In other words, interlocking engagement is produced between the locking ring holder 3 and the locking ring 1 as a result of the threading-in operation. As an alternative or in addition to this, that threading into the threaded bolt 2 involves establishing interlocking engagement between the coupling device 6 and the threaded bolt 2.

A further possible way of securing the locking ring 1 after the locking ring holder 3 has been threaded onto the locking ring 1 comprises drawing in the locking ring 1. Therefore, it can be provided that the locking ring holder 3 has a bore 3a, which runs in particular along the screw axis 5, for drawing in the locking ring 1 using a negative pressure, and in particular using a vacuum.

Figure 3:
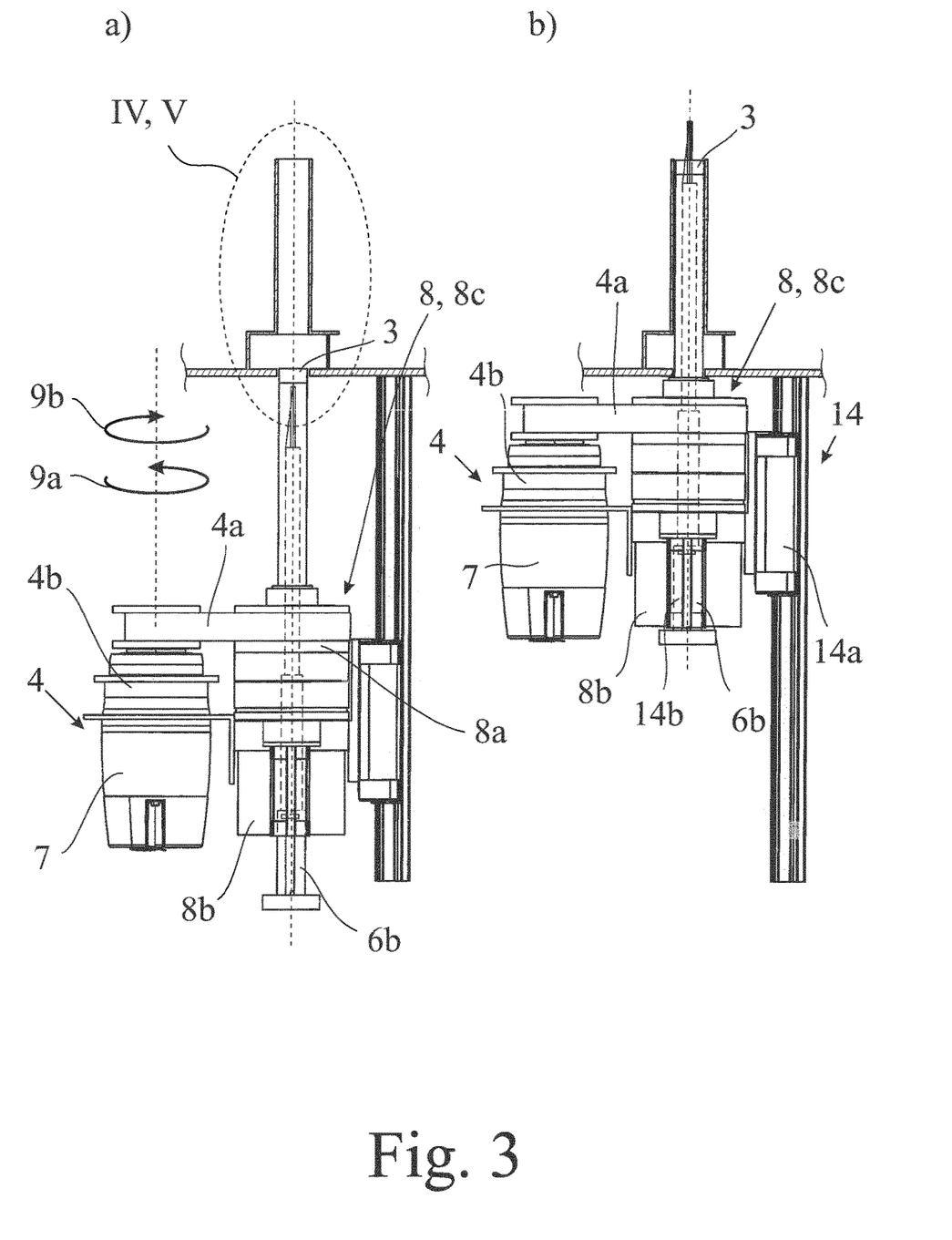
FIGS. 3a-b show the screwing apparatus of FIG. 1 a) before a linear movement and b) after a linear movement.

The above selective driving of the locking ring holder 3 or the coupling device 6 can be implemented in different ways in this case. An embodiment in this case provides that the rotary drive 4 has a motor 7 and a clutch arrangement 8, which may be, in particular, a freewheeling arrangement 8c, for driving engagement of the motor 7 with the locking ring holder 3 and the coupling device 6. The motor 7 can be a servomotor which is, in particular, torque- and/or rotation speed-controlled. This clutch arrangement 8 can be configured, in particular, such that only the locking ring holder 3 is driven in rotation due to the motor 7 moving in a first direction 9a, and the coupling device 6 is driven in rotation due to the motor 7 moving in a direction 9b which is opposite the first direction 9a. With this drive of the coupling device 6, it is possible according to a first variant for only the coupling device 6 to be driven or for the coupling device 6 and the locking ring holder 3 to be driven at the same time. The first direction 9a and the corresponding opposite direction 9b are each shown by way of example in FIG. 3a. FIGS. 4a, 4c and 5a likewise illustrate the corresponding receptacle rotation direction 9c and the coupling rotation direction 9d.

The special mechanical configuration of this clutch arrangement 8 can take place in any desired manner in principle in this case. In the illustrated exemplary embodiment, a belt 4a of the rotary drive 4 is provided, which belt couples the motor 7 to the clutch arrangement 8 which is a freewheeling arrangement 8c here. There is likewise a torque flange 4b of the rotary drive 4 for measuring the tightening torque, as a result of which torque-controlled tightening of the locking ring 1 is possible. The clutch arrangement 8 has a freewheel 8a—not illustrated in more detail here. Furthermore, the clutch arrangement 8 has a clamping unit 8b which can be brought into engagement with a splined shaft 6b in a shiftable manner for clamping engagement, which splined shaft 6b is in turn connected to the coupling device 6 in a rotationally fixed manner.

Owing to the freewheel 8a, it is possible, as described above, to alternately drive the locking ring holder 3 and the coupling device 6 in rotation depending on the movement direction of the motor 7. The coupling device 6 can also be clamped, in particular, with respect to a rotary movement by the clamping unit 8b, this being particularly advantageous when screwing the locking ring 1 onto the threaded bolt 2. It can be accordingly provided that the coupling device 6 is clamped, in particular, by the clamping unit 8b when the locking ring 1 is being screwed onto the threaded bolt 2.

It is further provided that the respective rotation directions of the locking ring holder 3 and of the coupling device 6 oppose one another. The rotation direction of the locking ring holder 3—the receptacle rotation direction 9c—, which is the result of driving by the rotary drive 4 and especially the motor 7, is illustrated in FIG. 4a—for threading onto the locking ring 1—and 5a—for screwing on the locking ring 1. The corresponding rotation direction of the coupling device 6—the coupling rotation direction 9d—during threading into the threaded bolt 2 is illustrated in FIG. 4c.

The locking ring holder 3 with the locking ring 1 can be moved entirely to the threaded bolt 2, as shown in FIGS. 4c and 5a, only after the coupling device 6 has been threaded into the threaded bolt 2. Therefore, in some embodiments, after the coupling device 6 has been threaded into the threaded bolt 2, the locking ring holder 3 is moved linearly with the locking ring 1 until the locking ring 1 makes contact with the threaded bolt 2. The locking ring 1 is then screwed on. Here, the linear movement can take place along the screw axis 5. Secondly, the coupling device 6 can be stationary substantially along the screw axis 5 during the linear movement of the locking ring holder 3. This is the result of the coupling device 6 remaining threaded into the threaded bolt 2—as is illustrated in FIGS. 4c and 5a—and of the clamping unit 8b firmly holding the splined shaft 6b by the above clamping engagement.

As already described, the method according to the proposal is generally used to connect connecting pieces 10a,b using the threaded bolt 2, wherein the connecting pieces 10a,b may be structural components, for example which are composed of aluminum, for an aircraft. Accordingly, the threaded bolt 2 can be passed through connecting piece openings 11a,b in connecting pieces 10a,b and a tube arrangement 12 runs around a bolt section 2a which protrudes out of the connecting piece openings 11a,b. The state of the tube arrangement 12 is shown in FIGS. 2a,b. Furthermore, a mating pressure piece, which is especially a rivet tool 10c here and, according to the illustration of FIG. 4c, is pressed against the connecting pieces 10a,b on that side which is averted from the tube arrangement 12, can be provided for fixing the threaded bolt 2 along the screw axis 5.

Owing to the provision of the above tube arrangement 12, the locking ring holder 3 and the coupling device 6 are firstly protected and secondly it is possible to accurately place the locking ring holder 3 and the coupling device 6 in relation to the threaded bolt 2 by the threaded bolt 2 which is passed through the connecting piece openings 11a,b or the bolt section 2a of said threaded bolt being enclosed by the tube arrangement 12. The desired relative position between the threaded bolt 2 on the one hand and the coupling device 6 and also the locking ring holder 3 is defined in this way. In this context, the coupling device 6 and/or the locking ring holder 3 are each moved linearly through the tube arrangement 12, this relating, in particular, to the respective movement described above. Particularly accurate relative placement can finally be achieved by the tube arrangement 12 having an inside diameter 13a which corresponds substantially to an outside diameter 13b of the locking ring holder 3.

In some embodiments, the coupling device 6 is linearly moved by a linear drive 14. In the present exemplary embodiment and as shown in FIGS. 2a,b, the linear drive 14 comprises a linear unit 14a which is pneumatically driven here and which can jointly move the coupling device 6, the locking ring holder 3 and also the motor 7 and the clutch arrangement 8 linearly, specifically along the screw axis 5. This corresponds to the embodiment according to which the locking ring holder 3 is linearly moved by the linear drive 14. Here, it is the case that the coupling device 6 and the locking ring holder 3 can each be moved by the linear drive 14 independently of one another. To this end, the linear drive 14a has a secondary drive 14b, which is a pneumatic cylinder in the present case. This secondary drive 14b is jointly moved by the linear unit 14a but, for its part, the coupling device 6 can move separately, in particular in relation to the locking ring holder 3, along the screw axis 5.

Now looking at the locking ring holder 3 in detail, it can be provided for said locking ring holder that the locking ring holder 3 has an inner contour 15a in order to fix the locking ring 1. According to the illustration of FIG. 2, this inner contour can be an inner polygon which corresponds, in particular, to an outer contour 15b and therefore here to the outer polygon of the locking ring 1. The locking ring holder 3 can also be of multipartite design and have, in particular, an exchangeable receiving crown. Similarly to the illustration of FIG. 2, this inner contour 15 can accordingly form a passage opening 16 through which the coupling device 6 can be moved, in particular along the screw axis 5. It is possible for the screw axis 5 to be arranged substantially centrally in relation to the passage opening 16.

The locking ring 1 is suitably placed before the locking ring holder 3 is threaded onto the locking ring 1. This can be done by a feed gripper 17 gripping the locking ring 1 and the locking ring 1 being positioned on the screw axis 5 in relation to the locking ring holder 3 in order to thread in the locking ring holder 3. This further automates the process and leads to only the above linear movement and rotary movement of the locking ring holder 3 being required for the threading-in operation. This gripping operation can take place at least additionally in a force-fitting manner. The locking ring 1 is advantageously taken from a store—not illustrated here. FIG. 4a shows a variant according to which the feed gripper 17 executes a movement substantially perpendicular to the screw axis 5 in order to position the locking ring 1. In order to make it easier to thread the locking ring holder 3 onto the locking ring 1, the locking ring 1—while it is gripped by the feed gripper 17—can be moved relative to the locking ring holder 3 after said locking ring has been positioned. This can take place both due to a movement of the feed gripper 17 toward the locking ring holder 3 and also conversely, or a movement both of the feed gripper 17 and also of the locking ring holder 3 toward one another.

In respect of the coupling device 6, it can be provided that it is a polygonal pin 6a which is threaded into a polygonal receptacle 2b of the threaded bolt 2. In addition, the coupling device 6 and, in particular, the polygonal pin 6a can be of multipartite design for the purpose of improved exchangeability of this part which is subject to wear.

Figure 2:
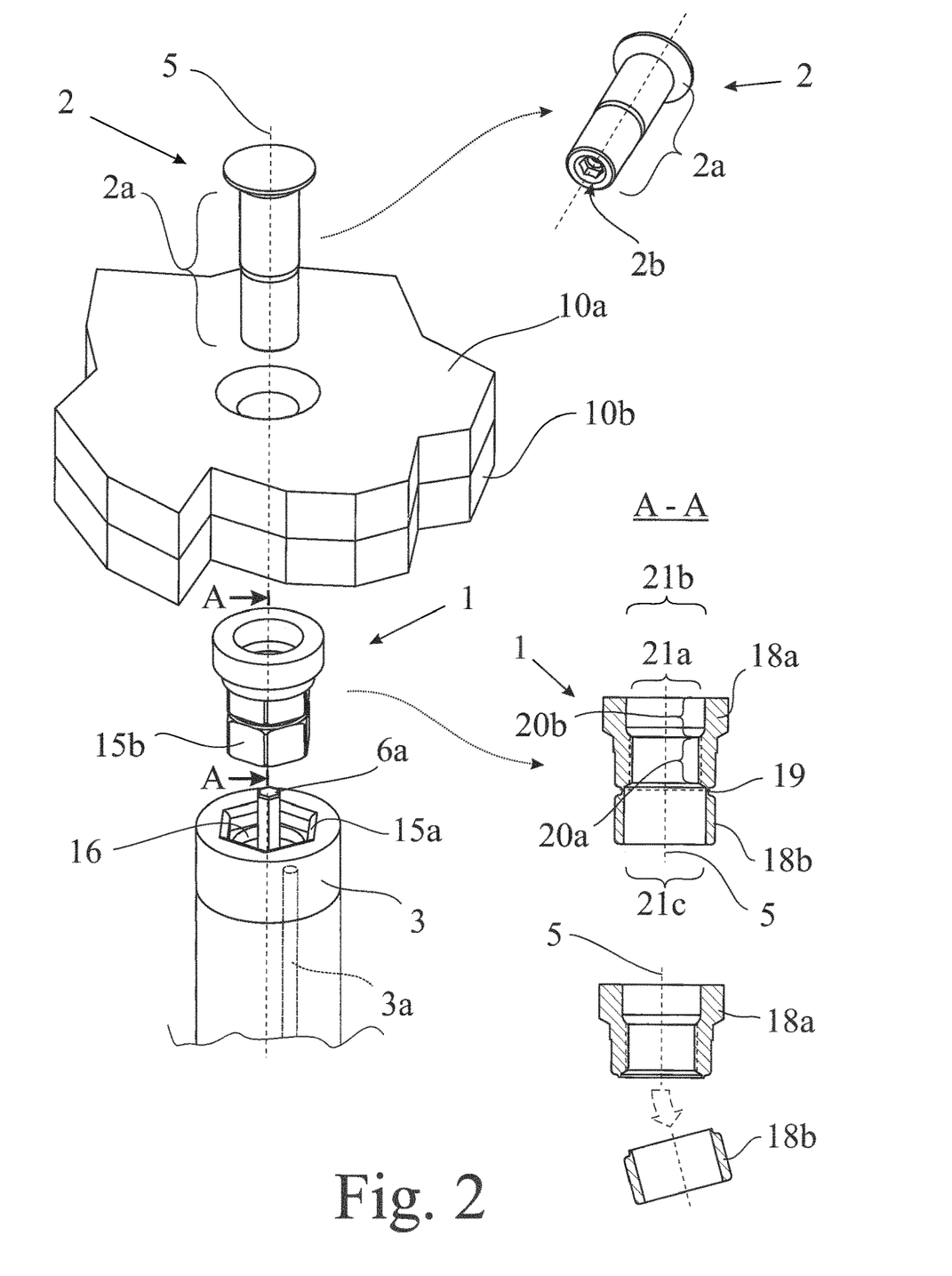
FIG. 2 shows a view of a detail of the locking ring holder and the coupling device of the screwing apparatus from FIG. 1, and also of a locking ring and a threaded bolt.

In principle, a large number of types of locking rings 1 can be screwed onto threaded bolts 2 using the proposed method. The method is particularly suitable for locking rings 1 with a tear-off section, which locking rings 1 are also called collars. It can therefore be that the locking ring 1 has a fastening part 18a and a tear-off part 18b, and that the tear-off part 18b is torn off from the fastening part 18a when an, in particular predefined, tear-off torque is reached when the locking ring 1 is being screwed on. In this way, it is possible to ensure that a desired tightening torque has been applied when the locking ring 1 is being screwed on. In some embodiments, the locking ring holder 3 acts on the locking ring 1 at the tear-off part 18b when said locking ring is being screwed on. As shown in FIG. 2 in particular, the locking ring 1 can have a predetermined breaking point 19 and, in particular, a material weakening between the fastening part 18a and the tear-off part 18b.

In the case of the locking ring 1, it can be provided that the tear-off part 18b has a thread-free inner wall. Since the tear-off part 18b is intended to be torn off, a screw-on operation is not required. In respect of the fastening part 18a, it can secondly be provided that the fastening part 18a has a threaded section 20a with an internal thread, and has a spacer section 20b which can be arranged on the bolt side in relation to the threaded section 20a and which has a thread-free inner wall. The spacer section 20b can be a deformation section for crimping. Accordingly, it can be provided that this spacer section 20b is deformed when the locking ring 1 is being screwed on and tightened. As is illustrated in FIG. 2, a spacer inside diameter 21b of the spacer section 20b may be larger than a thread inside diameter 21a of the threaded section 20a.

In respect of the tear-off part 18b, it is, as is likewise illustrated in FIG. 2, provided that a tear-off inside diameter 21c of the tear-off part 18b is larger than the thread inside diameter 21a and/or larger than the spacer inside diameter 21b.

Automation of the process of establishing the connection can also be continued after the tear-off part 18b has been torn off. Therefore, it can be provided that the locking ring holder 3 further grips the tear-off part 18b after the tear-off part 18b has been torn off. This is illustrated in FIG. 5b and allows the tear-off part 18b to be removed in an automated manner. As is likewise illustrated in FIG. 5b, the locking ring holder 3 with the tear-off part 18b may be moved away linearly from the threaded bolt 2, in particular along the screw axis 5, after the tear-off part 18b has been torn off, this therefore corresponding, in principle, to a reversal of the previous operation of guiding the locking ring holder 3 to the threaded bolt 2. Here, the coupling device 6 can be especially moved away from the threaded bolt 2 together with the locking ring holder 3, this also being shown in FIG. 5b.

The second teaching of the disclosure relates to a method for screwing a locking ring 1 comprising a fastening part 18a and a tear-off part 18b onto a threaded bolt 2. This method is characterized in that a removal gripper 22—which can be separate from the feed gripper 17—grips the tear-off part 18b and removes the tear-off part 18b after the tear-off part 18b has been torn off—it being possible for this to be performed in a force-fitting manner in particular.

This method according to the second teaching of the disclosure may also be a proposed method according to the first teaching of the disclosure. In this way, the processes of feeding the locking ring 1, establishing the connection and removing the locking ring 1 can be automated and therefore the individual steps can also be timed better.

Furthermore, it can be here that this gripping operation takes place after the locking ring holder 3 has been moved away from the threaded bolt 2. In respect of this removal operation, the removal gripper 22 can execute a movement perpendicular to the screw axis 5 in order to remove the tear-off part 18b, this being indicated in FIG. 5c. The tear-off part 18b can then be passed to a removal receptacle 23 by the removal gripper 22 allowing the tear-off part 18b to fall.

As described above, it is possible for the locking ring holder 3 to grip the tear-off part 18b or for the tear-off part 18b to remain in the locking ring holder 3 after the tear-off part 18b has been torn off. In order to make it easier to remove the tear-off part 18b in a situation of this kind, it can be provided that the tear-off part 18b is released from the locking ring holder 3 by the coupling device 6. This is illustrated in FIG. 5b. This releasing operation can take place especially by virtue of a linear movement of the coupling device 6 along the screw axis 5. It can be that the coupling device 6 has a lifting surface 6c for releasing the tear-off part 18b.

Finally, a proposed screwing apparatus for executing the proposed method—according to the first and/or the second teaching of the disclosure—is set up. Various embodiments of this screwing apparatus can be gathered from the above various embodiments of the proposed method.

The invention claimed is:

1. A method for screwing a locking ring onto a threaded bolt, comprising:
   threading a coupling device into a threaded bolt by driving the coupling device, for being threaded into the threaded bolt, in rotation by a rotary drive; and
   screwing the locking ring onto the threaded bolt with a locking ring holder, wherein the threaded bolt is fixed by the coupling device, wherein the locking ring holder is driven in rotation by the rotary drive.

2. The method as claimed in claim 1, wherein the locking ring holder is threaded onto the locking ring by being driven in rotation by the rotary drive.

3. The method as claimed in claim 2, wherein in order to secure the locking ring during threading of the locking ring holder onto the locking ring, the coupling device is moved linearly until it is guided through the locking ring.

4. The method as claimed in claim 2, wherein after the locking ring holder has been threaded onto the locking ring, the coupling device is moved linearly until the coupling device makes contact with the threaded bolt.

5. The method as claimed in claim 2, wherein threading onto the locking ring comprises establishing interlocking engagement between the locking ring holder and the locking ring, and/or wherein threading into the threaded bolt comprises establishing interlocking engagement between the coupling device and the threaded bolt.

6. The method as claimed in claim 1, wherein the locking ring holder has a bore for drawing in the locking ring using a negative pressure.

7. The method as claimed in claim 1, wherein the rotary drive has a motor and a clutch arrangement for driving engagement of the motor with the locking ring holder and the coupling device so that only the locking ring holder is driven in rotation when the motor moves in a first direction.

8. The method as claimed in claim 7, wherein only the coupling device is driven in rotation when the motor is moved in a direction which is opposite the first direction, and wherein the respective rotation directions of the locking ring holder and of the coupling device oppose each other.

9. The method as claimed in claim 1, wherein after the coupling device has been threaded into the threaded bolt, the locking ring holder is moved linearly with the locking ring until the locking ring makes contact with the threaded bolt.

10. The method as claimed in claim 1, wherein the threaded bolt is guided through connecting piece openings in connecting pieces, and wherein a tube arrangement runs around a bolt section which protrudes out of the connecting piece openings.

11. The method as claimed in claim 1, wherein the coupling device is moved linearly by a linear drive.

12. The method as claimed in claim 1, wherein the locking ring holder has an inner contour for fixing the locking ring, such that the inner contour forms a passage opening through which the coupling device can be moved.

13. The method as claimed in claim 1, wherein a feed gripper grips the locking ring and positions the locking ring on a screw axis relative to the locking ring holder for threading in the locking ring holder.

14. The method as claimed in claim 1, wherein the locking ring has a fastening part and a tear-off part and wherein the tear-off part is torn off from the fastening part when a tear-off torque is reached when the locking ring is being screwed on.

15. The method as claimed in claim 14, wherein the fastening part comprises a threaded section with an internal thread, and has a spacer section.

16. The method as claimed in claim 15, wherein a tear-off inside diameter of the tear-off part is larger than the thread inside diameter and/or larger than the spacer inside diameter.

17. The method as claimed in claim 14, wherein a removal gripper grips the tear-off part and removes the tear-off part after the tear-off part has been torn off.

18. The method as claimed in claim 17, wherein the tear-off part is released from the locking ring holder by the coupling device.

19. A screwing apparatus for screwing a locking ring onto a threaded bolt, comprising:
   a rotary drive; and
   a locking ring holder;
   wherein the screwing apparatus is configured to thread a coupling device into a threaded bolt by driving the coupling device, for being threaded into the threaded bolt, in rotation by the rotary drive; and to screw the locking ring onto the threaded bolt with the locking ring holder, wherein the threaded bolt is fixed by the coupling device, wherein the locking ring holder is driven in rotation by the rotary drive.

20. A method for screwing a locking ring onto a threaded bolt, comprising:

threading a coupling device into a threaded bolt by driving the coupling device, for being threaded into the threaded bolt, in rotation by a rotary drive; and screwing the locking ring onto the threaded bolt with a locking ring holder, wherein the threaded bolt is fixed by the coupling device, wherein the locking ring holder is driven in rotation by the rotary drive, wherein the rotary drive has a motor and a clutch arrangement for driving engagement of the motor with the locking ring holder and the coupling device so that only the locking ring holder is driven in rotation when the motor moves in a first direction and wherein the coupling device is driven in rotation when the motor is moved in a direction which is opposite the first direction.

* * * * *